United States Patent
Ito

(10) Patent No.: US 6,583,738 B2
(45) Date of Patent: Jun. 24, 2003

(54) POSITIONING SYSTEM

(75) Inventor: Yoshinori Ito, Nagano-ken (JP)

(73) Assignee: Harmonic Drive Systems Inc., Tokyo (JP)

(*) Notice: Subject to any disclaimer, the term of this patent is extended or adjusted under 35 U.S.C. 154(b) by 98 days.

(21) Appl. No.: 09/977,392

(22) Filed: Oct. 16, 2001

(65) Prior Publication Data

US 2002/0072813 A1 Jun. 13, 2002

(51) Int. Cl.[7] .................................................. H03M 5/22
(52) U.S. Cl. ...................................... 341/116; 341/160
(58) Field of Search ............................... 341/116, 160, 341/118, 112, 155

(56) References Cited

U.S. PATENT DOCUMENTS 5,066,953 A * 11/1991 Lengenfelder ............... 341/160
5,933,106 A * 8/1999 He ............................... 341/155

* cited by examiner

Primary Examiner—Brian Young
(74) Attorney, Agent, or Firm—Burns, Doane, Swecker & Mathis, L.L.P.

(57) ABSTRACT

A positioning system in which a absolute sensor detection signals are communicated to a controller, which is a personal computer, via a PC card. The PC card is provided with sensor connection terminals, a converter for converting sensor detection signals to digital position signals, PC connection terminals, a sensor drive circuit, and a switching circuit. The sensor switching circuit switches sensor connection terminals in accordance with commands from the personal computer, whereby one absolute sensor is excited or driven by the drive circuit, and detection signals from that sensor are converted to digital position signals that are fed to the personal computer. Using a PC card thus configured makes it possible to readily configure a positioning system having a plurality of absolute sensors.

7 Claims, 2 Drawing Sheets

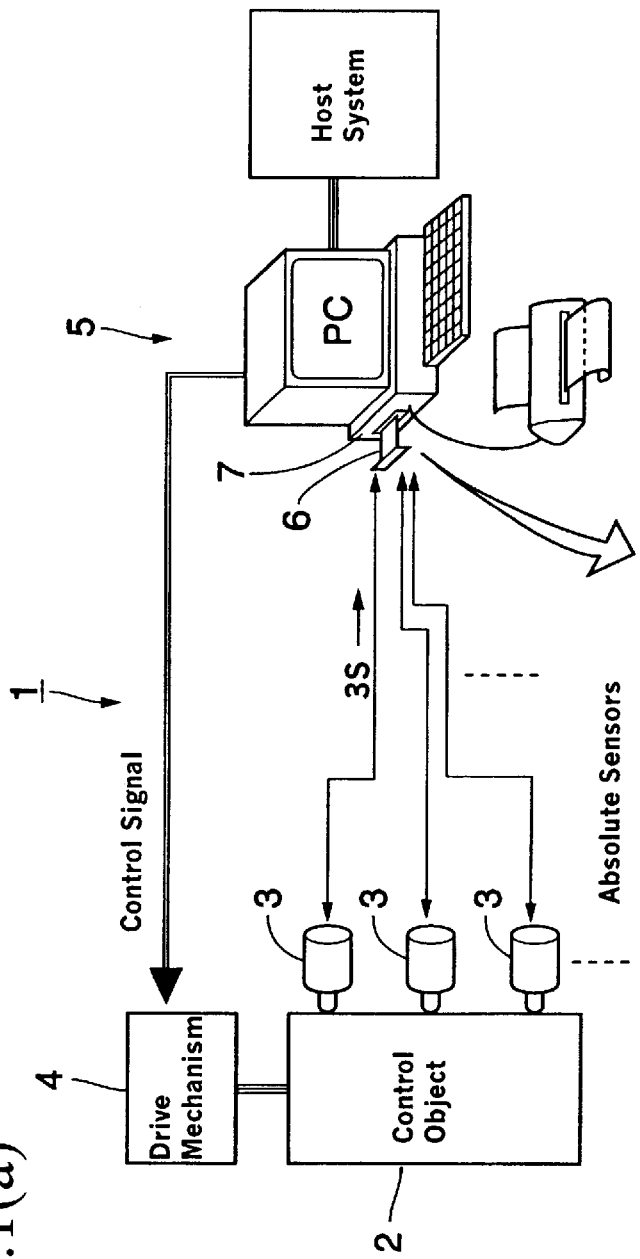
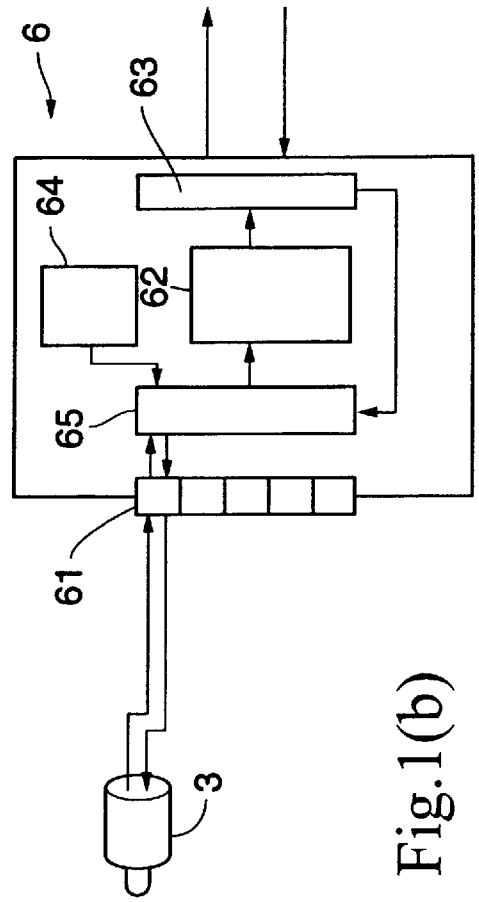
Fig.1(a)
Fig.1(b)

POSITIONING SYSTEM

This application corresponds to P-2000-209143 and P-2000-248110 filed in Japan on Jul. 11, 2000 and Aug. 18, 2000; the entire contents of which are hereby incorporated by reference.

BACKGROUND OF THE INVENTION

1. Field of the Invention

The present invention relates to a positioning system that uses absolute sensors to detect the position of a control object and, based on the detection result, moves the control object to a target position.

2. Description of the Prior Art

Absolute sensors such as optical absolute sensors and resolvers, differential transformers, potentiometers and the like are used for detecting the absolute position of objects that undergoing rotational or linear movement. Positioning systems that use such absolute sensors to control the positioning of a control object are usually equipped with a plurality of absolute sensors for multi-axial positioning control. In these systems, the multi-axial drive mechanisms are controlled to move the object to the target position based on detection signals from the absolute sensors.

The positioning system is equipped with a control system apparatus constituted by a microcomputer. Detection signals from the absolute sensors are input to the control system apparatus via an A/D conversion board and digital I/O board and the like. When the absolute sensors that are connected to a system are sensors such as resolvers and differential transformers that need to be driven by, for example, an excitation signal, such excitation is effected by means of a special-purpose transformer.

The number of absolute sensors that can be connected to a positioning system is limited by the number of signal bits. Usually only one sensor can be connected to an A/D conversion board. In the case of a digital I/O board, the number of sensors, which is to say the sensor resolution, depends on the number of bits. Thus, in order to connect the required number of sensors, the system configuration has to be modified by increasing the number of A/D conversion boards and digital I/O boards, which is complicated.

Moreover, when a plurality of sensors are connected to the system, a problem has been that, because the driving of the sensors cannot be individually controlled, each sensor has to be maintained in drive mode, which is not efficient.

SUMMARY OF THE INVENTION

An object of the present invention is to provide a positioning system having a plurality of absolute sensors that can readily be configured.

Another object of the present invention is to provide a positioning system having a plurality of absolute sensors the drives of which can be switchably controlled.

To attain the above and other objects, the invention provides a positioning system comprising a drive mechanism that moves a control object to a target position, absolute sensors that detect an absolute position of a control object moved by the drive mechanism, a control apparatus that controls the drive mechanism based upon detection results of the absolute sensors, and an interface apparatus via which absolute sensor output signals are input into the control apparatus;

the control apparatus being comprised by a personal computer and the interface apparatus being comprised by a PC card inserted into a card slot in the PC.

The PC card can include sensor connection terminals to connect the absolute sensors, a converter that converts signals input via the sensor connection terminals to digital position signals, PC connection terminals for supplying signals output from the converter to the PC, and a sensor drive circuit that supplies the absolute sensors with electrical drive power.

The PC card can also include a plurality of sensor connection terminals and a sensor switching circuit for switching between the sensor connection terminals and the converter in accordance with commands from the PC. In the case of such a configuration, preferably the sensor switching circuit should also switch the sensor connection terminal that is supplied with electrical drive power from the sensor drive circuit.

It is also preferable for the sensor drive circuit to include at least one selected from: resolver excitation circuit, differential transformer excitation circuit, potentiometer drive circuit, and optical or magnetic absolute encoder drive circuit.

It is preferable for the converter to include at least one selected from: a conversion unit for converting resolver output signals to digital position signals, conversion unit for converting differential transformer output signals to digital position signals, and a conversion unit for converting potentiometer output signals to digital position signals.

Further features of the invention, its nature and various advantages will be more apparent from the accompanying drawings and following detailed description of the invention.

BRIEF DESCRIPTION OF THE DRAWINGS

FIG. 1(a) shows the general overall configuration of a positioning system according to the present invention, and FIG. 1(b) shows the circuit configuration of a PC card.

DETAILED DESCRIPTION OF THE PREFERRED EMBODIMENTS

Figure 2:
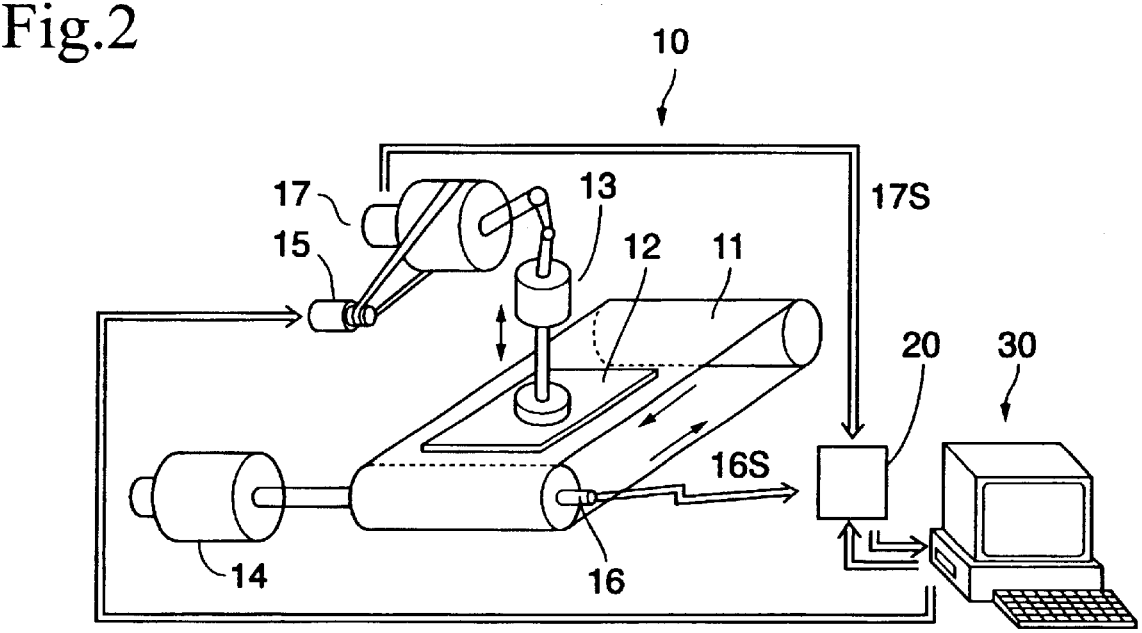
FIG. 2 shows an example of the overall configuration of a printing system in which the positioning system of FIG. 1 is applied.

FIG. 1(a) shows the general configuration of a positioning system using absolute sensors according to the present invention, and FIG. 1(b) shows the configuration of a PC card used by the system. As shown, the positioning system 1 has absolute sensors 3 for detecting the absolute position of a control object 2, a control apparatus 5 for controlling a drive mechanism 4 that drives the control object 2 based on the results of the detection by the absolute sensors 3, and an interface apparatus 6 via which signals 3S output by the absolute sensors 3 are input to the control apparatus 5. The control apparatus 5 is constituted by a personal computer. The interface apparatus 6 is a PC card (IC memory card) in a slot 7 in the PC. Thus, the positioning system 1 can be readily configured by using a PC card for the interface apparatus 6 between the absolute sensors 3 and the control apparatus 5, with the PC card being inserted into the card slot 7 of the PC 5 and each of the absolute sensors 3 being connected to PC card connection terminals 61.

In this typical configuration, the PC card has sensor connection terminals 61 to connect the absolute sensors 3, a converter 62 that converts signals input via the sensor connection terminals 61 to digital position signals, PC connection terminals 63 for supplying signals output from the converter to the PC 5, and a sensor drive circuit 64 that supplies the absolute sensors 3 with electrical drive power.

To connect the plurality of absolute sensors 3, the PC card (interface apparatus 6) can be equipped with a plurality of sensor connection terminals 61 and a sensor switching circuit 65 for switching between the sensor connection terminals 61 and the converter 62 based on commands from the PC 5. In such a case, sensors may be driven only when the sensors concerned are used for detection by having the sensor switching circuit 65 also switch to the sensor connection terminal 61 that is supplied with electrical drive power from the sensor drive circuit 64.

A typical absolute sensor can comprise a resolver, differential transformer, potentiometer or magnetic or optical absolute encoder, and the sensor drive circuit 64 can be configured to include at least one selected from a resolver excitation circuit, a differential transformer excitation circuit, a potentiometer drive circuit, and an absolute encoder drive circuit. The converter 62 can be configured to include at least one selected from a conversion unit for converting resolver output signals to digital position signals, a conversion unit for converting differential transformer output signals to digital position signals, and a conversion unit for converting potentiometer output signals to digital position signals.

FIG. 2 shows an example of the overall configuration of a printing system application of the above positioning system 1. The printing system 10, which uses a stamper 13 to perform prescribed printing on sheets 12 transported by a conveyor belt 11, has a conveyor-belt drive motor 14 and a stamper drive motor 15. The absolute position of the conveyor belt 11 is detected by a first absolute sensor 16 that is a resolver, and the absolute position of the stamper 13 is detected by a second absolute sensor 17 that is also a resolver.

Detection signals 16S and 17S output by the first and second absolute sensors 16 and 17 are input to a PC 30 comprising a control apparatus, via a PC interface card 20. The PC card 20 has the same type of configuration as the PC card shown in FIG. 1(b). That is, the PC card 20 has sensor connection terminals 61 to connect the absolute sensors 16 and 17, a converter 62 that converts sensor output signals 16S and 17S to digital absolute position signals, connection terminals 63 for supplying digital position signals 62S thus formed to the PC 30, a sensor drive circuit (excitation circuit) 64 that includes an excitation source for each of the absolute sensors, and a sensor switching circuit 65.

In accordance with commands from the PC 30, operation is alternated between the absolute sensors 16 and 17 by the switching circuit 65. This means that when sensor 16 is selected, the connection terminal portions of the sensor 16 comprising the input terminals in the sensor connection terminal 61 are connected to the converter 62 by the switching circuit 65, and at the same time the drive output terminals thereof are connected to the excitation circuit 64. As a result, the sensor 16 is excited and generates an absolute position signal 16S that represents the position of the conveyor belt. The signal 16S is input to the converter 62 where it is converted to a digital position signal that is supplied to the PC 30. The driving of the conveyor-belt drive motor 14 is controlled based on this absolute position signal received by the PC 30.

The same procedure is effected when sensor 17 is selected. That is, the connection terminal portions of the sensor 17 comprising the input terminals in the sensor connection terminal 61 are connected to the converter 62 by the switching circuit 65, and at the same time the drive output terminals thereof are connected to the excitation circuit 64. As a result, the sensor 17 is excited and generates an absolute position signal 17S that represents the absolute position of the stamper. The signal 17S is input to the converter 62 where it is converted to a digital position signal that is supplied to the PC 30. The driving of the stamper drive motor 15 is controlled based on this absolute position signal received by the PC 30.

Figure 3:
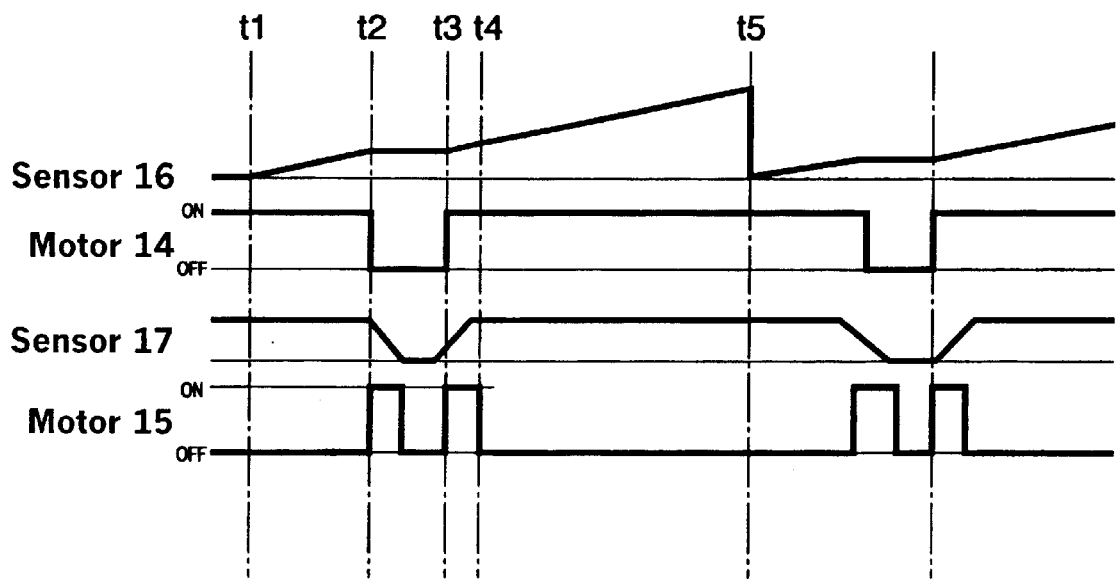
FIG. 3 is a chart showing the operational timing of the printing system of FIG. 2.

FIG. 3 is an example of the timing chart of the printing system 10. When the starting position of the conveyor belt 11 has been detected by the sensor 16 (point t1), the conveyor belt 11 is advanced and stopped at a point at which the output of the sensor 16 reaches a prescribed value (absolute position detection) (from point t1 to point t2). During the period when the conveyor belt 11 is at rest (point t2 to point t3), sensor input is switched to the sensor 17 side, driving the stamper 13 to print on the sheet 12. When the sensor 17 confirms that the stamper 13 has returned to its starting position (point t4), sensor input is switched to the sensor 16 side, and after the conveyor belt 11 moves to the starting position (point t5), the above operation is repeated.

The number of absolute sensors connected to the printing system 10 thus configured can be readily increased by just connecting the additional sensors to the sensor connection terminals 61 of the PC card 20. The absolute sensors 16 and 17 are only excited during input of detection signals from the sensor concerned, which, compared to the prior art in which both sensors are maintained in the excitation mode, has the merit of using less electrical power.

With respect to this embodiment, control of all the control objects can be centralized and the system readily connected to a host system (see FIG. 1(a)) via a factory-automation LAN or the like, by using a PC as the control apparatus. Thus, utilizing a PC greatly improves the overall function of the positioning system and the degree of design freedom.

While the foregoing embodiment has been described with reference to the use of a resolver, it is to be understood that other types of absolute sensor can also be used. If, for example, a differential transformer is used, a PC card can be used that is provided with an excitation circuit that includes an excitation source, and an A/D converter to digitize the sensor detection signals. For a potentiometer, the card can be provided with a drive circuit that includes a drive power source, and an A/D converter to digitize the sensor detection signals. For an optical sensor, the card can be provided with a drive circuit that includes the optical power source and a converter to convert the sensor detection signals to digital signals.

The converter used can be one that can convert the detection signals to various types of digital signal such as binary signals, gray-scale signals and BCD signals; software, for example, can be used to effect code conversion. Also, in addition to including the above-described excitation circuit and drive circuit, the configuration can include the above converters, whereby various types of absolute sensor can be connected.

As described in the foregoing, in the positioning system of this invention, detection signals from the absolute sensors are input to a control apparatus that is a PC, via an interface apparatus configured as a PC card, to effect positioning of a control object. Providing the PC card with a converter or the like to convert sensor detection signals to digital position signals makes it possible to readily configure a positioning system that uses absolute sensors. A positioning system having a plurality of absolute sensors can also be readily configured by equipping the PC card with terminals for connecting a plurality of absolute sensors. In particular, using a system equipped with a switching circuit for switching detection signal inputs from each absolute sensor and for switching the sensor drives, makes it possible to readily configure the positioning sensor having the requisite plurality of absolute sensors, by simply connecting each absolute sensor to the PC card.

What is claimed is:

1. A positioning system comprising:

a drive mechanism that moves a control object to a target position;

absolute sensors that detect an absolute position of a control object moved by the drive mechanism;

a control apparatus that controls the drive mechanism based upon detection results of the absolute sensors; and an interface apparatus via which absolute sensor output signals are input into the control apparatus;

the control apparatus being comprised by a personal computer and the interface apparatus being comprised by a PC card inserted into a card slot in the PC.

2. A positioning system according to claim 1, wherein the PC card includes:

sensor connection terminals to connect the absolute sensors;

a converter that converts signals input via the sensor connection terminals to digital position signals;

PC connection terminals for supplying signals output from the converter to the PC; and a sensor drive circuit that supplies the absolute sensors with electrical drive power.

3. A positioning system according to claim 2, wherein the PC card includes a plurality of sensor connection terminals; and a sensor switching circuit for switching between the sensor connection terminals and the converter in accordance with commands from the personal computer.

4. A positioning system according to claim 3, wherein the sensor switching circuit also switches the sensor connection terminal that is supplied with electrical drive power from the sensor drive circuit.

5. A positioning system according to claim 4, wherein the sensor drive circuit includes at least one selected from: resolver excitation circuit, differential transformer excitation circuit, potentiometer drive circuit, and optical or magnetic absolute encoder drive circuit.

6. A positioning system according to claim 5, wherein the converter includes at least one selected from: a conversion unit for converting resolver output signals to digital position signals, conversion unit for converting differential transformer output signals to digital position signals, and a conversion unit for converting potentiometer output signals to digital position signals.

7. A PC card used in a positioning system according to claim 1.

* * * * *